United States Patent [19]

Knecht et al.

[11] Patent Number: 4,905,575

[45] Date of Patent: Mar. 6, 1990

[54] SOLID STATE DIFFERENTIAL PRESSURE SENSOR WITH OVERPRESSURE STOP AND FREE EDGE CONSTRUCTION

[75] Inventors: Thomas A. Knecht, Chanhassen; Ahmed Naumaan, Bloomington; Stanley E. Rud, Jr., Eden Prairie, all of Minn.

[73] Assignee: Rosemount Inc., Eden Prairie, Minn.

[21] Appl. No.: 260,237

[22] Filed: Oct. 20, 1988

[51] Int. Cl.[4] .............................................. F01B 19/00
[52] U.S. Cl. ........................... 92/103 SD; 92/103 R; 92/98 R; 73/718; 73/721; 338/4
[58] Field of Search ............... 92/93, 96, 98 R, 103 R, 92/103 SD, 47, 103 M, 104; 73/718, 719, 717, 721, 726, 727, 756, DIG. 4, 720; 338/4, 42

[56] References Cited

U.S. PATENT DOCUMENTS

| | | | |
|---|---|---|---|
| 3,360,664 | 12/1967 | Straube | 310/8.2 |
| 3,793,885 | 2/1974 | Frick | 73/398 |
| 4,202,217 | 5/1980 | Kurtz et al. | 73/727 |
| 4,257,274 | 3/1981 | Shimada et al. | 73/718 |
| 4,498,078 | 2/1985 | Lirman | 73/720 |
| 4,511,878 | 4/1985 | Shimada et al. | 338/4 |
| 4,649,363 | 3/1987 | Starr | 73/721 |
| 4,773,269 | 9/1988 | Knecht et al. | 73/DIG. 4 |
| 4,782,319 | 11/1988 | Dell'Acqua et al. | 338/4 |
| 4,790,192 | 12/1988 | Knecht et al. | 73/DIG. 4 |
| 4,793,194 | 12/1988 | Wilner | 73/727 |
| 4,802,952 | 2/1989 | Kobori et al. | 73/727 |

FOREIGN PATENT DOCUMENTS

| | | | |
|---|---|---|---|
| 0115074 | 8/1984 | European Pat. Off. | 73/727 |
| 1055969 | 4/1959 | Fed. Rep. of Germany | 92/104 |
| 0139634 | 8/1982 | Japan | 73/756 |
| 0063829 | 3/1987 | Japan | 73/720 |
| WO88/00335 | 1/1988 | PCT Int'l Appl. | |
| 0569886 | 8/1977 | U.S.S.R. | 73/719 |
| 2154747 | 9/1985 | United Kingdom | 73/718 |

OTHER PUBLICATIONS

Miyata et al., "Si Diaphragm for Pressure Sensor", Jul. 23–25, 1986, Proceedings of SIC'86, pp. 559, 560.

Primary Examiner—Robert E. Garrett
Assistant Examiner—Thomas Denion
Attorney, Agent, or Firm—Kinney & Lange

[57] ABSTRACT

A solid state pressure sensor utilizes a brittle diaphragm made of a material such as silicon, which is mounted between base plates of glass, and which deflects in response to pressure. The base plates of glass can have recesses formed therein to receive the diaphragm and provide a full support across the diaphragm under overpressure conditions to prevent overstressing the diaphragm, or the diaphragm can have such contoured surfaces for forming overpressure stop surfaces against the facing base plate. The diaphragm has grooves defining a central portion that deflects, and whereby the grooves will form webs joining the central portion to an outer rim so that the diaphragm acts similarly to a "free edge" diaphragm in its deflection characteristics. The grooves defining the webs can have various configurations for achieving the results desired.

15 Claims, 3 Drawing Sheets

SOLID STATE DIFFERENTIAL PRESSURE SENSOR WITH OVERPRESSURE STOP AND FREE EDGE CONSTRUCTION

CROSS-REFERENCE TO RELATED APPLICATION

Reference is made to copending application Ser. No. 879,938, filed June 30, 1986 for DIFFERENTIAL PRESSURE SENSOR.

BACKGROUND OF THE INVENTION

1. Field of the Invention.

The present invention relates to solid state differential pressure transmitters which are internally protected against overpressure.

2. Description of the Prior Art.

Various solid state pressure transducers have been advanced, utilizing silicon diaphragms and glass base plates or housings. These devices are generally designed so that batch fabrication is possible. However, external mechanical protection against overpressure continues to be less than ideal, and the present invention deals with this problem, without sacrificing accuracy.

SUMMARY OF THE INVENTION

The present invention comprises a diaphragm construction which has "free edge" effects provided by forming grooves in from opposite surfaces of the diaphragm to define a center deflecting portion, and to delineate the center deflecting portion from a rim with a thin wall portion or web. The center deflecting portion preferably has a concave surface which becomes flat as the center portion deflects and which is used as a stop surface mechanically supported on a base plate when the differential pressure reaches a selected limit.

As shown the grooves forming the webs are peripheral, that is they go completely around the diaphragm center portion, regardless of the outer peripheral configuration, which can be square, rectangular, or circular. The rim of the diaphragm is supported relative to base support plate layers, which preferably are made of glass.

When differentials are applied to the diaphragm, the diaphragm will deflect and with the free edge construction the web that joins the center portion of the diaphragm to the rim permits the center portion of the diaphragm to move or deflect. The surface or surface portion of the diaphragm center portion will move to be in contact with an aligning surface or surface portion of the glass base support plate or layer at about twice the rated pressure. Additional overpressure will cause little additional stress in the diaphragm.

For equal deflections under the same pressure differentials, the diaphragms that are made with the free edge construction can be made from thicker wafers of brittle material than clamped edge diaphragms of equal diameter. The increased thickness makes the wafers less likely to break from accidental shock loads (handling) during processing.

In silicon wafers, the grooves that are formed to separate out the center portion and provide the free edge deflection characteristics can be etched from both sides of the wafer at the same time, using known etching techniques, and the wafer can also be polished on both sides before bonding to the base support plates or layers because it will be sturdy enough to handle.

A three-layer "sandwich" pressure cell is formed by placing base plates or wafers (preferably glass) on opposite sides of the wafers on which the diaphragms are formed (preferably silicon or other brittle material) and then bonding the base plates to the opposite sides of the diaphragm wafer. Individual pressure sensing cells are then separated out from the batch of cells that has been formed.

DETAILED DESCRIPTION OF THE PREFERRED EMBODIMENTS

As exemplified by the showing in International Publication No. W088/00335 of Rosemount Inc., pressure sensors have been constructed with concave or recessed surface diaphragms formed by pressurizing one side of the diaphragm to cause it to bulge and then removing the bulge by grinding or lapping. When the pressure is released, the diaphragm has a concave surface which can be used as a stop surface mechanically supported on a base plate when the diaphragm exceeds a desired operative pressure. Preferably the stop surfaces engage at twice the rated operating pressure The diaphragms of the present disclosure can be made with concave or recessed surfaces formed in a similar manner, but include a "free edge" construction.

Figure 1:
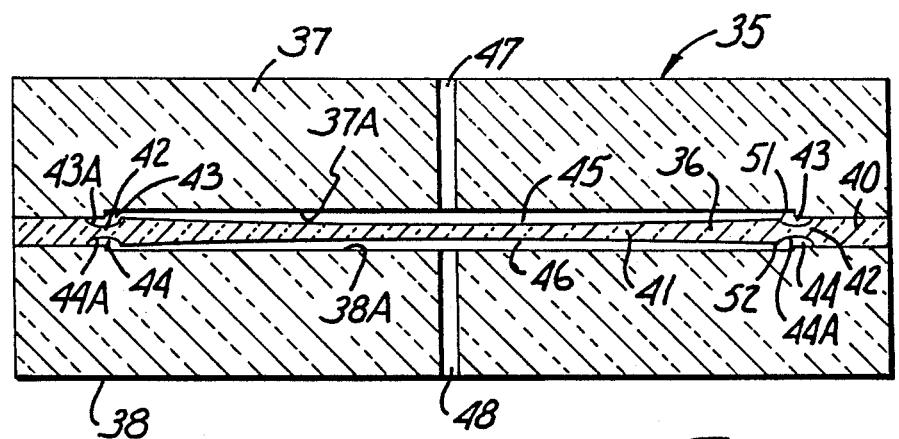
FIG. 1 is a sectional view of a sensing cell having a diaphragm made according to the present invention.

In FIG. 1, a pressure sensing cell indicated generally at 35 is shown formed according to the present invention. Cell 35 also can be placed into a suitable outer housing or support in a known manner. Cell 35 also can be batch fabricated using wafers of glass and a brittle material wafer (preferably silicon) that is of size to form several of the individual cells. The diaphragms for the individual cells are formed in place on the wafer. The diaphragms can be contoured to form recesses as described in the International Publication No. W088/00335. The silicon wafers are then bonded to glass wafers and sealed or bonded around the rim of each diaphragm. In this form of the invention, the diaphragm is made to act similarly to a free edge diaphragm. The free edge construction will reduce bending stresses at the diaphragm edge and will permit higher overpressures without breaking the diaphragm.

Pressure sensing cell 35 includes a diaphragm 36 sandwiched between glass base plates or layers 37 and 38, respectively. The base plates have been bonded (preferably by anodic bonding) to opposite sides of a rim portion 40 of the diaphragm 36 when in wafer form. The diaphragm 36 has a central active or deflecting portion 41, that is connected to the rim portion through a relatively thin web 42 that is formed by peripheral grooves 43 and 44, which extend inwardly toward the central plane of the diaphragm from the opposite sides of the diaphragm and surround the central portion 41.

The central portion 41 of the diaphragm has concave recessed surfaces indicated at 45 and 46, respectively, that face the base plates 37 and 38. These recessed surfaces 45 and 46 are preferably shaped so that when the center portion 41 is deflected at twice the maximum rated operating differential pressure between the opposite inlet apertures 47 and 48, respectively, the diaphragm surface contacts the respective glass base plate across substantially the entire surface of the diaphragm central portion simultaneously. The apertures 47 and 48 carry fluid pressures designated P1 and P2. The recessed surfaces 45 and 46 can be formed as disclosed in International Publication No. W088/00335 with FIG. 2 or can be etched in place to form the desired contour. As shown, the diaphragm support or stop surfaces 37A and 37B on the base plates are formed by very shallow recesses etched into the center portions of base plates 37 and 38. The recesses may have a depth in the range of 10% of the diaphragm center portion As the diaphragm 36 is subjected to differential pressure, there is a combination of movements that occur during deflection. The web 42 is preferably made to be as thick and as narrow as possible to survive high overpressures, but thin enough to reduce stresses that cause clamped edge diaphragms to fail from overpressure. The center portion 41 of the diaphragm will tend to deflect or bow to cause the respective recessed surface 45 or 46 to flatten out, depending on which way the diaphragm is deflecting. There is also a piston-like movement of the center portion 41 toward the respective surface 37A or 38A, at the same time that the respective center portion surface 45 or 46 is tending to become flat. When the diaphragm center portion 41 is under two times the maximum rated differential pressure, the surface 45 or 46, depending on the direction of deflection, will contact the respective surface of the adjacent base plate and will seat thereon as a positive stop while subjected to overpressure.

Figure 2:
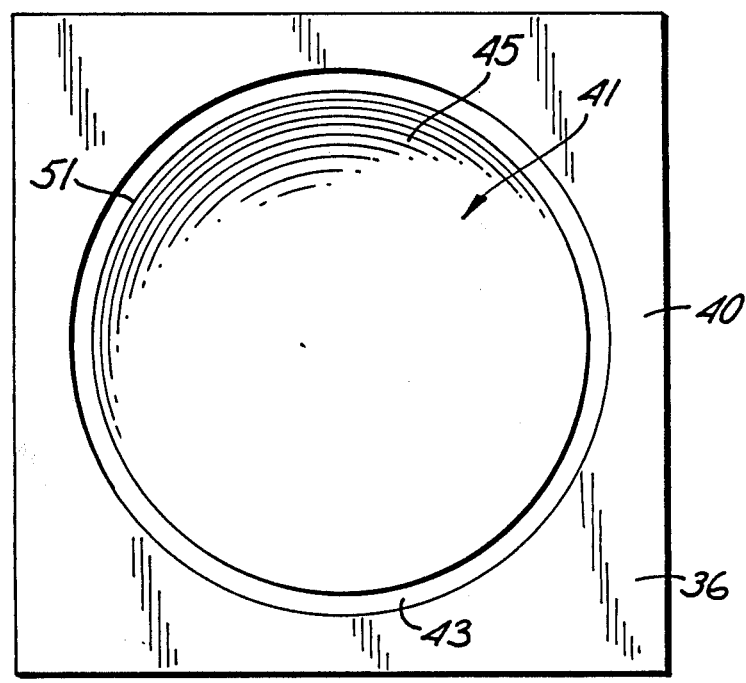
FIG. 2 is a plan view of a diaphragm used in the sensing cell of FIG. 1.

The grooves 43 and 44, as shown, have generally flat or very gently contoured bottom surfaces 43A and 44A with radiused corners that will distribute stress without unacceptable concentration. The grooves 43A and 44A can be simultaneously etched to desired depths into both sides of the wafer used for batch fabricating the diaphragms prior to separating out the individual sensing cells. Of course, the other areas of the diaphragm can be masked during this etching process in a known manner. The diaphragm center portions generally are circular, as shown in FIG. 2.

Figure 3:
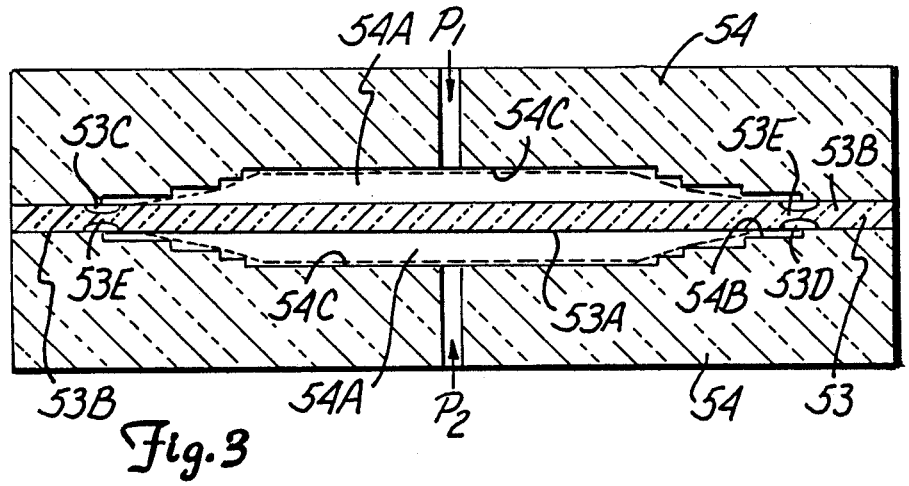
FIG. 3 is a sectional view of a modified sensor cell construction.

In FIG. 3, a diaphragm 53 is preferably made of silicon or a similar excellent spring material, such as single crystal germanium, sapphire or quartz. Diaphragm 53 is provided with a center active portion 53A formed by grooves 53C and 54D to provide a web 53E which gives a free edge construction relative to a rim 53B. The center portion 53A has sensing surfaces substantially coplanar with the support surfaces of rim 53B. In this form of the invention, base plates 54 are bonded to the rim 53B of the diaphragm 53. The base plates have stepped recesses 54A for providing overpressure stop surfaces for the deflected diaphragm. The recesses as shown are stepped and have a plurality of shoulder surfaces 54B, that are constructed to have corners that engage the deflected central portion of the diaphragm on several contact lines when the diaphragm reaches its maximum desired deflection as represented in dashed lines The corners of the shoulders mechanically stop the diaphragm center portion 53A from further deflecting to minimize additional stresses under high overpressures. The stepped arrangement is configured to reduce diaphragm stress when subjected to overpressure. As can be seen, the shoulder lateral widths are different so the corners lie along the deflected shape or line of the diaphragm. A smoothly contoured recess in the base plates for supporting the entire facing surface of the deflected center portion under overpressure is preferred for operation. The stop surfaces 54B will reduce the stressing rate of the webs when the center portion 53A contacts such surfaces and also will reduce the rate of further stressing of the center portion of the diaphragm. A smoothly contoured recessed stop surface in the base plate will provide support with little additional diaphragm stress, even under high overpressures.

Forming the recesses in the base plates or in the diaphragm, including a smoothly contoured recess or the stepped recess, can be accomplished by impact grinding, molding, electrostatic discharge machining (EDM), or photoshaping and etching (in one step or in a series of steps). Photoshaping and etching can be used as a finishing step, after grinding or after forming the general shape desired by other steps. Other acceptable types of micro machining can be used to make the contours if desired, depending on the type of material used for the sensor.

Figure 4:
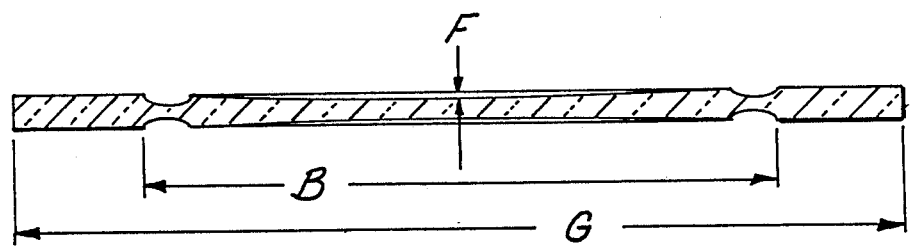
FIGS. 4 and 4A are schematic representations showing typical dimensions for a diaphragm of a pressure sensor made according to the present invention.
Figure 4A:
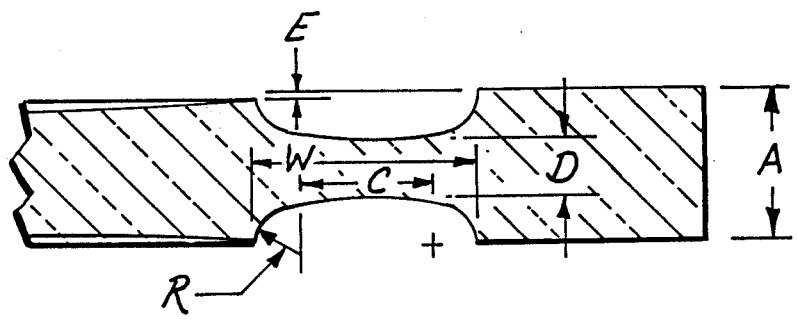

A cross-section of the diaphragm 36 is illustrated in FIGS. 4 and 4A. The diaphragm illustrated there has dimensions represented and labeled with letters The dimensions include the outside dimension (G); thickness of the peripheral rim (A); the outside dimension of the grooves (B); the groove width (W); the width of the relatively flat bottom surface portion (C); the radius of the corner of the groove base (R); the thickness of web 42(D); as well as the depth (F) of the recess in the surfaces of the center deflecting portion measured from the adjacent plane of one surface of the rim of the diaphragm; and the distance from the plane of the diaphragm rim to the edges 51 or 52 (E). The distance (E) will be the same around the periphery of the center portion because the diaphragm is symmetrical. Also, the overall groove width (W) is the sum of the bottom surface width (C) plus two of the radiuses (R). Referring to those designations of dimensions, preferred dimensions for a differential pressure sensor utilizing a silicon diaphragm rated at 6 psi differential are as follows:

A = .0074 inches
B = .260 inches
W = .0137 inches
C = .009 inches
R = .0023 inches
D = .0028 inches
E = .00005 inches
F = .0005 inches
G = .450 inches The web thickness (D) is selected in relation to the width (W) so under a selected overpressure value the stress level in the web does not exceed a desired level.

The dimension (C) is desirably minimized but it will have a finite value because of the need to have an opening in the mask for etching the groove.

For different pressure ranges, significantly different dimensions would be used and for diaphragms of different diameters the dimensions would change. The above dimensions are by way of illustration only.

FIGS. 5-8 show various configurations for diaphragms that exhibit free edge characteristics, and each of these may have curved, recessed surfaces on the center portions thereof or be mated with base plates having recesses to provide for a surface to surface contact for overpressure protection. Radial stress isolation and reduction of bending stresses is achieved in FIG. 5 for a diaphragm 56 shown therein by having a pair of equally spaced apart peripheral grooves 57 and 58 formed into one side surface 59 of the diaphragm. Grooves 57 and 58 are spaced apart in lateral or radial directions. A center peripheral groove 60 is formed inwardly from the opposite surface 61 of the diaphragm 56 and is located laterally or radially between grooves 57 and 58. The grooves 57 and 58 are sufficiently deep in relation to the groove 60 so that the inner end surfaces of the grooves overlap in the thickness direction of the diaphragm, to form two webs or wall sections 62 and 63 that surround the center portion. The grooves 57, 58 and 60 overlap or extend across the bisecting plane of the diaphragm which is parallel to the support surfaces of the diaphragm. The wall sections 62 and 63 are stiff in direction perpendicular to the plane of the diaphragm, but flex relatively easily in a radial or outward direction from the center portion 65 of the diaphragm 56 to isolate radial and bending stresses between the center portion 65 and the rim portion 64 of the diaphragm.

Figure 5:
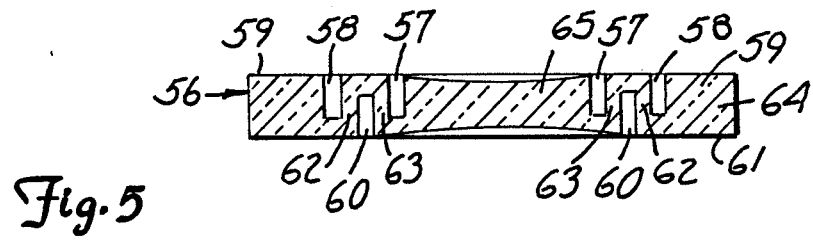
FIGS. 5, 6, 7 and 8 are cross-sectional views of diaphragms that are made in modified forms of the present invention.

The configuration of FIG. 5 reduces the radial stress effects on span caused by the effects of different temperature coefficients between a silicon diaphragm and a glass base and also tends to reduce span errors from line pressure changes which cause radial tensioning in other diaphragm designs (i.e. FIGS. 1-4) where radial stresses re carried between the diaphragm rim and the diaphragm center portion.

The center portion 65 is defined by inner web 63. Thus, the surfaces on opposite sides of the center portion are of different size, but again each includes a recessed surface for providing a positive stop against glass base plates that sandwich the diaphragm as shown in FIG. 3. The glass base plates provided will be designed to provide the desired stop surface.

The base plates used with the diaphragms can be suitably formed with recesses to provide a stop surface when there are flat surfaces on the center portions of any of the diaphragms shown in FIGS. 5-8 if desired.

Figure 6:
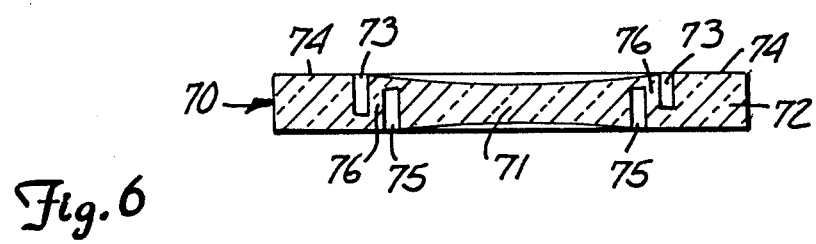

In FIG. 6, a diaphragm 70 is shown. It has a center portion 71 and a rim portion 72 surrounding the center portion 71. For use, the rim portion 72 is bonded to support or base plates and pressure differentials on the diaphragm will cause the center portion 71 to deflect The center portion 71 is defined by a first groove 73 that extends inwardly from a first surface 74 of the diaphragm and which separates the center portion 71 from the rim. A second groove 75 extends inwardly from an opposite surface 76A of the diaphragm. The grooves 73 and 75 are offset from each other in lateral or radial direction, that is, in direction between the center axis of the diaphragm and the rim, and their inner ends overlap in direction of the thickness of the diaphragm. In other words, the groove ends extend more than halfway across the thickness of the diaphragm. The grooves form a thin web 76 that connects the center portion 71 to the rim 74. The web 76 also easily yields in radial direction, but is stiff in direction perpendicular to the plane of the diaphragm. This also gives the advantage of reducing the bending stresses at the diaphragm rim.

Figure 7:
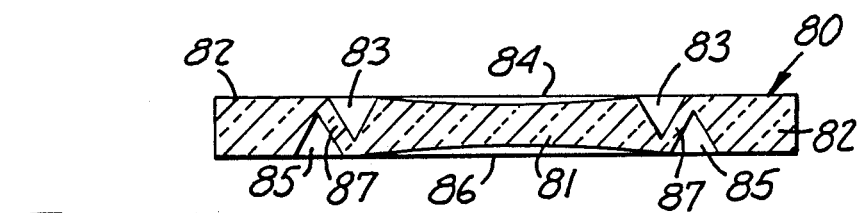

FIG. 7 shows a similar diaphragm construction for free edge benefits The diaphragm indicated generally at 80 includes a center portion 81 and a rim 82. A peripheral groove 83 is formed in a surface 84 of the diaphragm, and a peripheral groove 85 is formed in the opposite surface 86 of the diaphragm. The grooves 83 and 85 are generally V-shaped, and their inner ends overlap in direction of the thickness of the diaphragm. This provides a thin wall section or web 87 that is flexible in radial directions and stiffer in direction perpendicular to the plane of the diaphragm. The center portion 81 is capable of deflecting without substantial radial or bending stress transmission from the rim to the center portion 81. The grooves 83 and 85 are offset in lateral direction of the diaphragm.

The V-shaped grooves of FIG. 7 also can be configured as shown in FIG. 5, with two V-shaped grooves extending inwardly from one side of the diaphragm with one groove extending inwardly from the opposite side of the diaphragm and positioned between the two grooves similarly to groove 60 in FIG. 5. The etching process for forming the diaphragms of FIGS. 5, 6 and 7 is usually an anisotropic etch. The outer periphery of the diaphragms is rectangular or square and the shape of the periphery of the center portion depends on the crystal orientation of the silicon. With a {100} crystal orientation, the center deflecting portion of the diaphragm will have a square outer periphery and V-shaped grooves. If the silicon for the diaphragm has a {110} crystal orientation, the center deflecting portion of the diaphragm will have a parallelogram shaped outer periphery and vertical walled grooves. This phenomenon is well known in the field of etching.

It should be noted that the center deflecting portions of each of the diaphragms in FIGS. 5-7 are recessed to provide a flat stop surface when deflected for seating on flat surfaces of base plates for overpressure stops.

Figure 8:
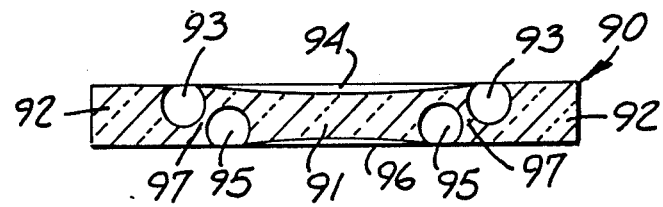

In FIG. 8, a further modified form of the construction of a free edge silicon diaphragm 90 is illustrated. The diaphragm 90 includes a center deflecting portion 91, and a rim 92 for supporting the center portion. The rim 92 is mounted to one or more base plates as desired. A first groove 93 is formed into a first surface 94 of the diaphragm and a groove 95 is formed into a second surface 96 of the diaphragm. The grooves 93 and 95 offset laterally and are generally elliptically shaped. The bottom surfaces of the grooves overlap in direction of thickness of the diaphragm to form a peripheral web or wall section 97 that joins the center portion 91 to the rim 92 and makes the center portion deflect in part like a free edge diaphragm.

The free edge construction formed by grooves 93 and 95 does permit a thicker diaphragm wafer to be used for batch processing, and uniform overpressure support is not as critical. The surfaces on opposite sides of the center portion of the diaphragm are recessed (concave) slightly as shown for seating against flat surfaces of glass base plates which would sandwich the diaphragm when the diaphragm is assembled into a sensing cell.

Each of the forms of the invention have an advantage of having a sturdy brittle material diaphragm, and good overpressure protection, particularly when used in connection with a free edge form.

It should be noted that when a flat free edge form diaphragm is utilized, such as that shown in FIGS. 5 through 8 for example, a concave recess in the glass base plate could be used for providing an overpressure stop, and it could be smoothly contoured or stepped (or tiered like a shallow wedding cake) so that the center portion of the diaphragm was supported only at desired locations rather than across its full surface.

When using the free edge construction that is shown in the present invention, for the diaphragms, the stress level in the webs or thin walls of the free edge diaphragm is kept low, and at a rated 6 psi differential pressure the web stress can be kept in the range of 4,600 psi. At 4,000 psi differential pressure, which is 666 times full scale rated pressure, the web stresses for the example of FIG. 4 will be 46,000 psi, only 75% of the fracture stress of silicon, which is approximately 60,000 psi. The construction shown provides overpressure protection across a reasonable range of overpressures.

As was stated, with an applied pressure on one side of the diaphragm (a differential pressure), part of the deflection of the modified free edge form of the diaphragm shown herein is from the center portion, and part is from the piston effect that occurs when bending takes place in the web or thin wall section. This configuration thus has several advantages in the processing sequence of a three layered cell, such as that shown in FIGS. 1 and 3, in that the grooves can be etched in both sides at once, using isotropic etching, or anisotropic etching, or a combination of the two types of etching. A wafer of silicon from which the diaphragms are formed can be pressure polished on both sides before bonding because it is sturdy enough to handle. The diaphragms disclosed in FIGS. 5-8, with a thick center portion also could afford an improvement in reducing span line pressure errors.

The webs disclosed herein reduce the proportion of the diaphragm bending stress transmitted into the glass base plate as the diaphragm moves. If the webs are too thick, the glass will tend to fail from diaphragm bending stress before the web stress level is close to the failure stress for the diaphragm material, and if the webs are too thin, the webs will be overstressed and fail long before the glass approaches its failure stress level. The design is optimized such that at maximum rated overpressure, the web dimensions are selected so the maximum operating stress level in the webs is attained just prior to the time that the stress in the glass base plate, which supports the diaphragm rim, attains the maximum operating stress level for the glass.

The webs are formed by etching the grooves to provide smooth and clean surfaces thereon so that the webs can be stressed relatively highly without cracking. The webs are not lapped. Lapping can cause slight scratches that tend to weaken the diaphragm. Since the diaphragms are made of brittle materials, such as semi-conductors or glass (if suitable sensing is used), the elimination of scratches in highly stressed surfaces is very desirable. In overpressure condition the webs are not supported and they are the highest stressed region of the diaphragm.

The diaphragms in FIGS. 2 and 8 an be any peripheral shape. The cross-section of the grooves can be controlled. For example, in FIG. 8 the opening in the mark used for etching the grooves is kept small and the etch is controlled as to time to permit the part circular or elliptical grooves.

The sensing of the deflection of the diaphragms can be done in a conventional manner, but metalizing the glass layers to form capacitance plates, and using a semi-conductor diaphragm, such as silicon as an active plate, will permit capacitive sensing of deflection. Strain gauges also can be used easily.

The drawings are distorted to permit illustration. The recesses are very shallow in relation to the width of the diaphragm.

Although the present invention has been described with reference to preferred embodiments, workers skilled in the art will recognize that changes may be made in form and detail without departing from the spirit and scope of the invention.

What is claimed is:

1. A differential pressure sensor cell comprising a brittle material diaphragm member having a desired thickness:

first and second base plates mounted to opposite side of said diaphragm member to form enclosed chambers relative to said diaphragm member, said base plates being bonded around the periphery of the diaphragm member to enclose said chambers on opposite sides of the diaphragm member; and said diaphragm member comprising a brittle material and having a central portion and a rim, said central portion being defined by groove means extending inwardly from a surface means of the diaphragm member to define web means between the rim and the central portion, and the central portion having a surface which is concave at a rest position of the diaphragm member, the concave surface becoming substantially flat as the diaphragm deflects under an overpressure and which engages and is stopped by a substantially flat aligning surface of the associated base plate when the diaphragm is subjected to such overpressure.

2. The apparatus of claim 1 wherein said groove means extends inwardly from opposite sides of said diaphragm.

3. The apparatus of claim 1 wherein said groove means are formed by isotropic etching, and wherein each of said groove means has a radiused inner end surface.

4. The apparatus of claim 2 wherein said groove means leave said web means having a thickness in direction of deflection of the diaphragm equal to a dimension D, selected to be stressed at a level so the overpressure at which breakage of the web occurs is maximized.

5. The apparatus of claim 2 wherein said first and second base plates, said diaphragm member and said web means have dimensions selected such that the stress level of the diaphragm member at maximum rated overpressure occurs in the same range as when failure of the base plate occurs from such overpressure.

6. The apparatus as specified in claim 2 wherein said groove means comprise a pair of generally triangular cross section grooves extending inwardly from opposite sides of the diaphragm member and overlap in direction of thickness of the diaphragm, and are spaced to provide the web means between the grooves.

7. The apparatus as specified in claim 2 wherein said groove means comprise first and second grooves extending inwardly from one side of said diaphragm member, said first and second grooves being spaced from each other around the periphery of the center section, and a third groove extending inwardly from an opposite surface of said diaphragm member, said third groove being positioned between said first and second grooves, and the inner ends of said first, second, and third grooves overlapping in direction of the thickness of the diaphragm member.

8. The apparatus as specified in claim 2 wherein said groove means comprise a first groove extending inwardly from a first side of said diaphragm member and positioned at a first lateral dimension relative to a center axis of the diaphragm member, and a second groove extending inwardly from an opposite side of said diaphragm member, said second groove being positioned at a second lateral dimension on the diaphragm member different from the first lateral dimension, to define peripheral dimensions that are different from each other, said first and second grooves having inner ends that overlap in direction of thickness of the diaphragm member, and the overlapping portions of the grooves defining said web means.

9. The apparatus as specified in claim 8 wherein said first and second grooves are generally elliptical in cross section.

10. The apparatus as specified in claim 8 wherein said first and second grooves have inner surface end portions that are generally flat.

11. A pressure sensor diaphragm for mounting between two base plates made of brittle material relative to which the diaphragm deflects under pressure differentials, said diaphragm comprising a brittle material and being generally planar in shape, and having a thickness and a peripheral edge, groove means defined in said diaphragm to extend inwardly from at least one surface thereof to define a narrow web means extending between an outer rim portion of the diaphragm and an inner center portion of the diaphragm formed by said groove means, said rim portion being supported on at least one base plate during use, said diaphragm and web means having dimensions such that when a high pressure is applied to at least one side of said diaphragm to cause the center portion to deflect the stress levels in a base plate on which the diaphragm is supported and in the web means of such diaphragm reach their respective operating stress level at substantially the same pressure.

12. The diaphragm of claim 11 wherein there are groove means extending inwardly from both sides of said diaphragm to form said web means.

13. The diaphragm of claim 11 wherein said center portion has a recessed surface on a surface thereof opposite from the pressure causing movement of the center portion to permit supporting said center portion on an adjacent base plate after the center portion has deflected to a position wherein said recessed surface assumes a substantially planar shape.

14. The diaphragm of claim 13 wherein the center portion recessed surface is smoothly contoured and deflects to be substantially planar at a desired pressure greater than the operating pressure for the diaphragm.

15. A differential pressure sensor cell comprising a brittle material diaphragm member having a desired thickness;

first and second base plates mounted to opposite sides of said diaphragm member to form enclosed chambers relative to said diaphragm member, said base plates being bonded around the periphery of the diaphragm member to enclose said chambers on opposite sides of the diaphragm members; and said diaphragm member comprising a brittle material and having a central portion and a rim, said central portion being defined by groove means extending inwardly from a surface means of the diaphragm member to define web means between the rim and the central portion;

one of the base plates having a central portion surface facing a central portion surface of the central portion of the diaphragm member, one of the central portion surfaces being a stepped surface facing the other central portion surface to provide overpressure stops at radially spaced positions on the diaphragm central portion when excessive pressure acts on the diaphragm member.

* * * * *

UNITED STATES PATENT AND TRADEMARK OFFICE
CERTIFICATE OF CORRECTION

PATENT NO. : 4,905,575
DATED : March 6, 1990
INVENTOR(S) : Thomas A. Knecht et al.

It is certified that error appears in the above-identified patent and that said Letters Patent is hereby corrected as shown below:

Column 2, line 37, delete "pressure The" and insert --pressure. The--.

Column 5, line 33, delete "re" and insert --are--.

Column 9, line 33, after "deflect" and insert a --,--.

Signed and Sealed this

Seventh Day of May, 1991

Attest:

HARRY F. MANBECK, JR.

*Attesting Officer*  *Commissioner of Patents and Trademarks*